July 27, 1943.   P. PFISTER   2,325,539
TIME PIECE WITH CHRONOGRAPH
Filed Aug. 12, 1940
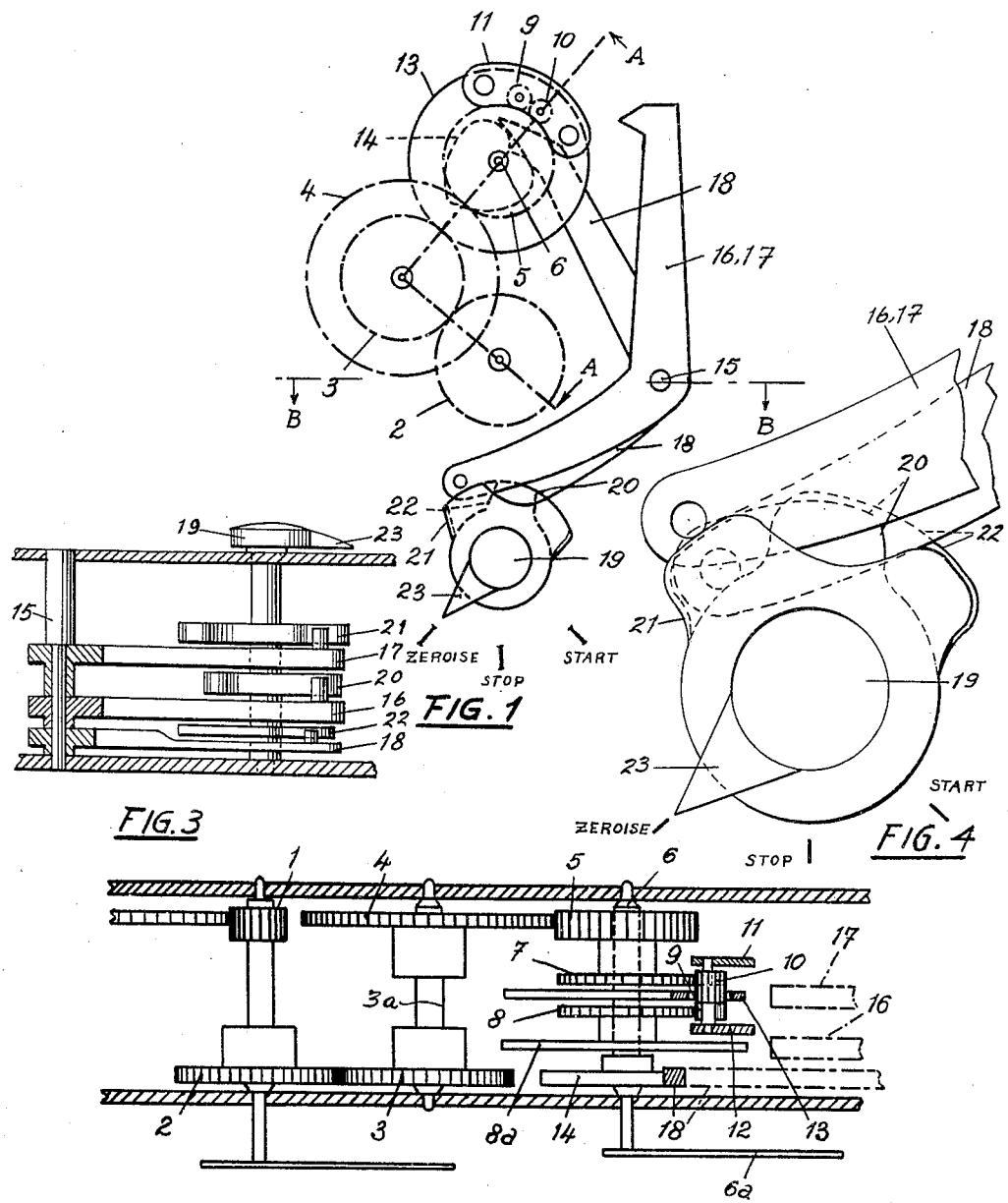

Patented July 27, 1943

2,325,539

UNITED STATES PATENT OFFICE 2,325,539

TIMEPIECE WITH CHRONOGRAPH

Pierre Pfister, Sonceboz, Switzerland, assignor to the firm Societe Industrielle de Sonceboz SA, Sonceboz, Switzerland Application August 12, 1940, Serial No. 352,322
In Switzerland August 22, 1939

2 Claims. (Cl. 58—74)

This invention relates to a time piece provided with a chronograph mechanism and is directed more particularly to the novel device employed for controlling the indicating means of the chronograph mechanism.

The object of the invention is to omit the special driving members used in ordinary chronograph mechanism, such as ratchet wheels, tipping levers and wheels with pointed teeth, and to substitute therefor ordinary toothed wheels and pinions, adapted to transmit to the chronograph indicating means the exact motion of the movement of the time piece instead of a motion which has been distorted in its transmission through said special members as in the case of an ordinary chronograph mechanism.

The invention, therefore, contemplates the provision of a differential gear serving as operative connection between the indicating means of the chronograph mechanism and the movement of the time piece, said differential gear comprising a main axle, two sun wheels freely revoluble on said main axle, two planet pinions disposed parallel to one another and meshing each with the two sun wheels, and a member fast with the main axle and carrying said planet pinions, one of said sun wheels being connected to the movement of the time piece so as to be driven thereby, and the main axle being connected to the indicating member of said chronograph mechanism.

The invention consists further in the provision of a control device associated with the differential gear and being operative temporarily to arrest either the other of the two sun wheels or the main axle, according to whether the indicating member is to be brought into operation or rendered inoperative, or to reset the chronograph mechanism to zero when both the main axle and said other sun wheel are again released for rotation.

The above and other objects and advantages of the invention will be apparent from the detailed description which follows, when considered in conjunction with the accompanying drawing, which illustrates a preferred embodiment of the invention, and wherein:

Fig. 1 is a plan view of parts of the operative connection between the movement and the chronograph mechanism of a time piece and of parts of the control device according to the invention.

Fig. 2 is a section along the line A—A of Fig. 1.

Fig. 3 is a reversed detail sectional view taken on line B—B of Fig. 1.

Fig. 4 is a plan view on an enlarged scale of the cams and control button system.

Referring in detail to the drawing, the parts shown therein comprise a pinion 1 carrying on its axle one of the indicating members of the time piece, for example the seconds hand. Also carried on the axle of the pinion 1 and fast therewith is a toothed wheel 2 meshing with a second toothed wheel 3 fast on an axle 3a parallel with the first mentioned axle. The gear ratio of the toothed wheels 2, 3 is 1:1. The axle 3a carries also a third toothed wheel 4 fast on said axle and meshing with a fourth toothed wheel 5. The gear ratio of the toothed wheels 4, 5 is 2:1.

The toothed wheel 5 is freely revoluble on an axle 6. The axle 6 constitutes the main axle of a differential gear.

The differential gear comprises two sun wheels 7, 8, both of which are freely revoluble on the main axle 6. The sun wheel 7 is fast with the toothed wheel 5, while the sun wheel 8 is fast with a circular disc 8a which is therefore freely revoluble on the main axle 6 along with the sun wheel 8. The sun wheels 7, 8 mesh with a pair of planet pinions 9, 10, the axes of which are parallel to one another. The pinions 9, 10 are carried on axles which are freely revoluble in bridge pieces 11, 12 spaced apart as shown in Figure 2 and carried on a second disc 13 interposed medially between the two sun wheels 7, 8. The disc 13 is fast with the main axle 6, having a press-fit thereon.

To the main axle 6 is also secured a heart-shaped cam 14 and a chronograph hand 6a as is clearly shown in Figure 2.

Mounted on a shaft 15 so as to be freely pivotable thereon are a pair of retaining levers 16, 17, the planes of pivoting of which about the axis of the shaft 15 are respectively coincident with the planes of the discs 8a and 13 and the arrangement is such that in their operative positions the levers engage the said discs respectively, at the periphery thereof, so as to arrest the rotation of the discs and therefore the parts of the mechanism with which respectively the discs are fast, namely the sun wheel 8 and the main axle 6.

Also mounted upon the shaft 15 but fast therewith is a presser lever 18 which is adapted by bearing upon the peripheral edge of the heart-shaped cam 14 to rotate the cam and therefore the main axle 6 with the chronograph hand 6a to a zero position as hereinafter described.

The two retaining levers 16, 17 and the presser lever 18 are operated by a single button 19 common to them all. The axle of the button 19 carries for this purpose three cams 20, 21, 22 which are fast with the axle and are so disposed as respectively to assume positions opposite the lower ends of the retaining levers 16 and 17 and the presser lever 18. The three cams turn with the button as the latter is rotated by hand in the operation of the control device constituted by the retaining levers, the presser lever, the button and the cams and the arrangement is such that in turning, the cams act upon the retaining levers and the presser lever, so as to oscillate the various levers about the axis of the shaft 15, thereby bringing one or the other of the retaining levers into the operative position according to the angular position of the button and therefore of the cams or, in still another position of the button and the cams, the presser lever 18.

The button 19 is provided with a pointer 23, the function of which is to indicate the angular position of the button and therefore of the cams, there being three operative positions for these parts, namely the "start" position, in which the indicating member of the chronograph mechanism is brought into operation, a "stop" position in which the indicating member of the chronograph mechanism is rendered inoperative, and a "zeroizing" position in which the parts of the chronograph mechanism are automatically reset to zero.

The retaining levers 16, 17 are urged to their operative positions by spring means (not shown) which operate, therefore, through the intermediary of the retaining levers to lock the mechanism in the positions corresponding to the said "start" and "stop" positions of the button 19 and associated cams.

The presser lever 18 is similarly urged to the operative position by spring means (not shown), that is to say, upon the button being turned to the "zeroizing" position. In this position, both levers 16 and 17 are brought to their inoperative position, as explained further and as shown in Fig. 1.

A spring (not shown) causes the pointer 23 and with it the whole system of cams to return to the "stop" position as soon as the button 19 is released from the zeroizing position.

The mechanism operates in the following manner:

The toothed wheels 2, 3, 4, 5 are constantly in gear and they turn with constant speed in a determined direction. The wheel 5 drives the sun wheel 7 at twice the speed of the pinion 1.

If the retaining lever 17 is in the operative position, the sun wheel 7 drives, through the intermediary of the two planet pinions 9, 10, the sun wheel 8, together with the disc 8a with which it is fast. The sun wheel 8 and the disc 8a being freely revoluble on the main axle 6, rotate thereon, while the axle and therefore the chronograph hand 6a remain stationary. The button is now in the "stop" position.

Upon turning the button 19 to the start position, the retaining lever 17 becomes automatically withdrawn from the operative position to the inoperative position in which it appears in Figure 1 and the other retaining lever 16 becomes released to move to the operative position under its spring control. The result is that the disc 13 is released for rotation solidly with the axle 6 and the chronograph hand 6a, whilst the other disc 8a and the associated sun wheel 8 are held against rotation. The axle 6 now commences to rotate at half the speed of the sun wheel 7, that is at the same speed and in the same direction as the pinion 1.

At the end of the operative cycle of the chronograph the button 19 is turned to the stop position, whereupon the operation continues again in the manner described above.

For resetting the mechanism to zero, the button 19 is turned to the zeroizing position. In this position of the button and the associated pointer and cams, the two retaining levers 16, 17 are both brought to the inoperative position (Fig. 1), whilst the presser lever 18 is released to be moved to the operative position, in which by bearing upon the peripheral edge of the heart-shaped cam 14, it functions to rotate the cam and with it the axle 6 and the hand 6a to zero position. In this connection it will be observed that with the two retaining levers 16, 17 both in the inoperative position, the axle 6 of the differential gear is entirely free to turn either in the clockwise or the anti-clockwise direction, since both the disc 13 carrying the planet pinions 9, 10 and also the disc 8a fast with the sun wheel 8 are free.

The construction above described is essentially simple as compared with chronograph constructions hitherto employed, in that it substitutes ordinary toothed wheels and pinions for the usual ratchet wheels, tipping levers and wheels with pointed teeth.

The toothed wheels and pinions of the improved form of mechanism in accordance with the invention, may have cut teeth either of cycloidal profile or of a profile conforming to the evolute, so as to transmit to the indicating hand of the mechanism, the exact movement of the pinion 1 instead of a movement which has been distorted in its transmission through the mechanism as in the case of an ordinary chronograph mechanism.

The toothed wheels 2, 3, 4, 5 are constantly in gear. Consequently, the spring barrel of the time piece is always subjected to approximately the same torque, irrespective of whether the chronograph mechanism is operating or not.

From the foregoing, it is believed that the construction and advantages of the present invention may be readily understood by those skilled in the art without further description, it being borne in mind that numerous changes may be made in the details disclosed without departing from the spirit of the invention as set out in the following claims.

What is claimed and desired to be secured by Letters Patent is:

1. In a time piece with a chronograph mechanism, an operative connection between the indicating member of the chronograph mechanism and the movement of the time piece, said operative connection including a differential gear comprising a main axle, two sun wheels freely revoluble on said main axle, two planet pinions disposed parallel to one another and meshing each with the two sun wheels, and a member fast with the main axle and carrying said planet pinions, one of said sun wheels being connected to the movement of the time piece so as to be driven thereby, and the main axle being connected to the indicating member of said chronograph mechanism, and a control device associated with said differential gear and being operative temporarily to arrest either the other of the two sun wheels or the main axle, according to whether the indicating member is to be brought into operation or rendered inoperative, or to reset the chronograph mechanism to zero when both the main axle and said other sun wheel are again released for rotation.

2. In a time piece with a chronograph mechanism, an operative connection between the indicating member of the chronograph mechanism and the movement of the time piece, said operative connection including a differential gear comprising a main axle, two sun wheels freely revoluble on said main axle, two planet pinions disposed parallel to one another and meshing each with the two sun wheels, and a first disk concentric and fast with the main axle and carrying said planet pinions, one of said sun wheels being connected to the movement of the time piece so as to be driven thereby, and the main axle being connected to the indicating member of said chronograph mechanism, a second disk concentric and fast with the other of said sun wheels, a heart-shaped cam fast with the main axle, and a control device associated with said differential gear and comprising two retaining levers adapted to be selectively brought into operation, a presser lever, and an operating button common to all said levers and carrying three cams upon its axle which are so disposed as respectively to assume positions opposite the lower ends of the retaining levers and the presser lever, one of said retaining levers being operative to arrest the first disk and therefore the main axle by engaging said first disk, the other of said retaining levers being operative to arrest the second disk and therefore the said other sun wheel by engaging said second disk, and the presser lever being adapted to bear upon the heart-shaped cam on said main axle, while the retaining levers are both held in an inoperative position, to effect a resetting of the chronograph mechanism to zero.

PIERRE PFISTER.